United States Patent [19]
Amos et al.

[11] 3,952,133
[45] Apr. 20, 1976

[54] PRESSURE-SENSITIVE DISPLAY BOARD

[76] Inventors: Homer C. Amos, 1086 Marshall Way; Edward T. Strickland, 816 N. Patencio Road, both of Palm Springs, Calif. 92262

[22] Filed: Dec. 14, 1973

[21] Appl. No.: 424,759

Related U.S. Application Data

[63] Continuation of Ser. No. 323,659, Jan. 15, 1973, abandoned, which is a continuation of Ser. No. 167,305, July 29, 1971, abandoned, which is a continuation of Ser. No. 835,161, June 20, 1969, abandoned, which is a continuation-in-part of Ser. No. 612,547, Jan. 30, 1967, abandoned.

[52] U.S. Cl. ............................. 428/354; 427/207; 427/208; 428/334
[51] Int. Cl.² .......................................... C09J 7/02
[58] Field of Search ............ 117/76 A, 122 P, 68.5, 117/122 PF, 122 PA, 98; 427/207, 208; 428/354, 334

[56] References Cited
UNITED STATES PATENTS

| | | | |
|---|---|---|---|
| 2,292,024 | 8/1942 | Dreher | 40/140 |
| 3,061,460 | 10/1962 | Schickedanz | 117/98 |
| 3,500,129 | 3/1970 | Jowitt | 317/9 |

*Primary Examiner*—Bernard D. Pianalto
*Attorney, Agent, or Firm*—Owen, Wickersham & Erickson

[57] ABSTRACT

A bulletin board, display panel or other posting device, having a pressure-sensitive surface on a thick resilient backing, has inproved object-retaining properties. The resilient backing may be a polyether-polyurethane or polyester-polyurethane foam having an indentation load delfection of about 45 pounds per square foot (about 22 grams per square centimeter). The preferred pressure-sensitive adhesive is a water-washable tacky elastomer with a Young's modulus of elasticity of about 5 to 50 psi (about 350 to 3500 grams per square centimeter).

14 Claims, 17 Drawing Figures

PRESSURE-SENSITIVE DISPLAY BOARD

This application is a continuation of application Ser. No. 323,659 filed Jan. 15, 1973, now abandoned, which was a continuation of application Ser. No. 167,305 filed July 29, 1971, now abandoned, which was a streamlined continuation of application Ser. No. 835,161, filed June 20, 1969 now abandoned, which was a continuation-in-part of application Ser. No. 612,547 filed Jan. 30, 1967, now abandoned.

This invention relates to display boards such as bulletin boards, game boards, and the like, adapted to retain paper and other articles without the use of thumb-tacks or other extrinsic fastening means. More particularly, the invention relates to a display board having a pressure-sensitive adhesive surface onto which paper, cards, coins, keys, and even heavier articles may be removably mounted and retained thereon for extended periods of display by simply pressing the article against the adhesive surface. The invention is especially concered with means to facilitate proper adherance for articles of different weights and textures. A preferred form of the invention is concerned with an adhesive for such a board, having extended activity and ready removation.

Various attempts have been made by the art to devise means for displaying papers, cards and the like upon notice boards without the use of thumb tacks, adhesive tapes or other extraneous fastening devices. Such fastening devices have the disadvantages not only of frequently being unavailable when most needed, but also of sometimes being destructive to the articles or to the board itself. Also, when such fasteners are readily available to a group of potential users, there is the tendency on the part of some individuals not to restrict their activities to the board that is provided but to fasten notices and the like on the adjacent walls and woodwork with obvious unsightliness and damage.

To meet this problem it has been proposed by some to use a board having a sticky, pressure-sensitive surface whereby notice and the like could be posted merely by pressing the notice onto the board, and various non-drying adhesives have been proposed for such use. Such proposals have met with but limited success due, partly, to the fact that most adhesives will adhere too severely if the article is applied with sufficient pressure to avoid "creep" and premature dislodging from the board under the normal force of gravity. If too firmly applied, the article cannot be removed when desired without damage to the article, and even to the board. For example, paper notices applied to the pressure-sensitive adhesive surface may, within a few hours, become so firmly attached that they cannot be removed without delamination of the paper and with a resultant residue being left behind still attached to, and destroying the effectiveness for further use of, the adhesive.

It has been proposed, with some success, to use a less energetic adhesive and to apply the adhesive to the board in such a manner that its exterior surface is rough or "pebbled". A light paper article could then be applied to the board with only the high spots of the pebbled surface coming into contact with the paper. The paper could then be removed at a later time with only a minimum of delamination. When posting a heavier object, or one having a greater weight per available surface, the greater adhesion needed could be obtained by using greater pressure thereby forming the pebbled surface sufficiently to present a larger area of contact. Such boards, though somewhat useful, have proven generally to be unreliable; if the adhesive used is too soft, it is deformed permanently by the force needed to attach heavy articles, thereby partially destroying the pebbling of the surface; and, if the adhesive is too stiff, it too readily returns to its original shape and prematurely releases the article attached.

It has been proposed with some success, that certain waxes be used as the adhesive. However, these have had the disadvantage that upon removal of a posted object (or adherend), a layer of wax comes off on the adherend, contaminating its surface and gradually destroying the board.

The foregoing disadvantages are largely overcome by the present invention which provides novel means for regulating the pressure applied to the adhesive surface and the amount of deformation caused thereby, thereby gaining control (if the surface of the adhesive is rough) over a wide latitude of the percentage of area of the adhesive which is brought into actual contact with the adherend. This is accomplished by supplying a cooperating resiliency means substantially independent of the resiliency of the adhesive itself, so that an adhesive can be selected with main regard to its adhering properties, with proper flexibility and surface deformation being controlled mainly through the properties of the resilient means, and also the combination of this means with a particular type of pressure-sensitive adhesive designated as "washable tacky elastomer" and described in our co-pending patent application Ser. No. 612,547, being further referred to later in this disclosure. In this manner we have found that a display board can be fashioned which will retain both light and heavy objects with remarkable freedom from the problems mentioned above.

In the foregoing discussion, and in the following description and claims, for convenience and brevity the terms "bulletin board" and "board" may be used in a broad sense to generically include various forms of display devices, panels and the like, whether rigid or flexible (as a pad), flat or curved (as a cylinder), fixed or movable. These terms should be so interpreted when the sense permits.

An object of the invention is to provide an improved display device adapted to removably retain papers, cards and other objects without the use of extraneous fastening means.

Another object is to provide a display board having a pressure-sensitive adhesive surface to which articles of different sizes and shapes can be mounted by simple pressure against the adhesive surface and a resilient means cooperating with the adhesive surface for conveniently controlling the amount of pressure and adhesion in accordance with that required for the size and weight of each article.

An object of a preferred form of the invention is to provide a display board with an adhesive surface for removably attaching articles for display, the board having a resilient means cooperating with a special adhesive in such a manner that their combined properties give improved adhesion and removability to the articles, freedom from adhesive-retention on removed articles, and extended life and washability of the adhesive surface.

Other objects may become apparent from the following description.

Briefly, the invention comprises a slab or layer of resilient material of considerable thickness (such as, for example, 0.25 inch (about 6.5 mm) of polyurethane foam) on the face of which is a thin layer of pressure-sensitive adhesive adapted to retain paper and/or other articles upon contact. The back of the slab may, if desired, be permanently molded, or otherwise attached, to a rigid base of wood, cardboard, or other selected material. Preferably, however, the back surface is coated with an adhesive (which may, or may not, be the same pressure-sensitive adhesive used on the front face) to permit attachment by the user to a wall, door, cabinet, column, piece of furniture, or any other desired location. Suitably, the slab may be reinforced with fabric, especially on its reverse side. It has been found that the resilient slab with a mere facing of pressure-sensitive adhesive, when formed with a rough surface, permits much more positive and convenient control of the adhesion to various types of articles than can be effected by any of the prior art devices. Thus, the percentage of the contact area which is in actual contact with the object to be displayed can easily be controlled over a wide range (from less than 1% to 95% or more) by the initial pressure. For example, a piece of paper is instinctively brushed on lightly by the user and only the high points of the foam-backed adhesive make contact, which is sufficient to hold the paper permanently while providing easy removal without injury. The roughness is especially helpful in the instance of a paper adherend, because low-quality papers such as newsprint delaminate very easily, and a contact pattern comprising a large number of small points of contact tends to pull occasional individual fibers loose rather than to start an area of delamination that tends to grow until it destroys the paper. On the other hand, heavier objects are instinctively pressed firmly against the bulletin board, roughly in proportion to their weight; and, as the pressure is increased, the percentage of contact area rises rapidly until the adhesive forces required to support the heavier objects are readily obtained. The resilient base has dimensions and elasticity sufficient to recoverably deform at least 1/16 inch (about 0.16 cm) upon application of a perpendicular force of 16 ounces to 1 square inch (about 70.3 gms to 1 square centimeter) of surface.

In addition to providing excellent pressure control, as discussed above, for the variety of adhesive forces needed for an all-purpose bulletin board, the resilient foam slab also readily conforms to irregular or curved surfaces permitting the attachment and display of such objects as keys, pens, coins, medals, watches, and the like. The thickness, resiliency and/or coarseness of the foam may be varied within rather wide limits to suit individual tastes and to fully cooperate with any particular adhesive used. As a guide, successful performance has been obtained with a tacky adhesive, having a peel test according to the particulars described below of from 10° to 40° and less than 1 hour when applied with a surface roughness of approximately 1000 microinches (about 25 microns) to a ¼ inch (about 6.5 mm) slab of polyether polyurethane foam having approximately 60 pores per lineal inch, (about 24 pores per lineal centimeter) a density of 1.45 lbs./cu. ft. (about 0.023 grams per cubic centimeter) and an indentation load deflection ("ILD" per ASTM specification D 1564 -62 T) of 45 lbs./sq. ft. (about 22 grams per square centimeter).

Though, by proper selection, favorable results in accordance with the invention may be obtained with a variety of pressure-sensitive adhesives, superior effects are obtained with the type of adhesive described in our co-pending application Ser. No. 612,547 filed Jan. 30, 1967. Such adhesive is remarkably suited to the purposes of this invention, since it is notably free from creep under load, does not deposit on articles attached, does not absorb or embed small fibers, and is washable.

Briefly, the preferred pressure-sensitive adhesive is a water-soluble, true-solid elastomer, having a low modulus of elasticity, and, for this invention, a low internal viscosity, and medium high free surface energy. Internal viscosity in a solid may be a new concept to some people, and an example may help: a vinyl garden hose has a high internal viscosity, while gum rubber has a lower internal viscosity; even though it may be "harder", a gun rubber tube suffers no harm from being run over by a car, while a vinyl garden hose (especially if old and cold) can be cracked to pieces by the same treatment, because it cannot deform quickly enough. If the rubber tube be heavy, it may require more weight to flatten it than to flatten the vinyl hose; the rubber flattens partway immediately and stays there, while the vinyl slowly flattens out completely; hence, the vinyl is considered softer because it flattens out further, but it is slow to do so, because it has a higher internal viscosity.

Being a true solid, the adhesive of this invention avoids many disadvantages of the conventional pressure-sensitive adhesives which are highly viscous liquids having the tendency to creep freely, deposit on (and even penetrate into) attached articles, and embed lint and other small particles. In contrast, our true solids derive their adhesiveness from their low modulus of elasticity and high elongation which permits them to rapidly deform, without rupture, to a near-perfect molecule-to-molecule fit with articles brought into contact, thus allowing the Van der Waals forces of their free surface energy to act.

Another advantage of our preferred true-solids over conventional pressure-sensitive adhesives is their washability. Bulletin boards in use will eventually have their surface contaminated with acquired lint, fuzz, dust, and other particles. With our true-solids, with their high resilience, such particles do not become embedded in the adhesive, but remain on the surface and may easily be washed off completely clean by sponging with warm soapy water. This remarkable effect is contrary to all useful experience with a material which feels like a sticky, viscous, pitch-like liquid. The adhesive, being insoluble in water, is not affected by the washing. The mechanism by which particles and fibers wash free is discussed in our previously-referred-to co-pending patent application.

The invention may be more fully understood by reference to the drawings, wherein.

Figure 1:
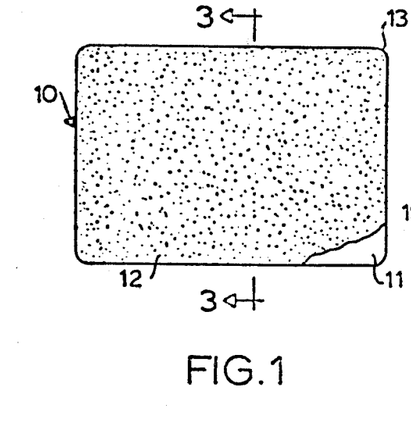
FIG. 1 is a face view of a display device in accordance with a form of the invention.
Figure 2:
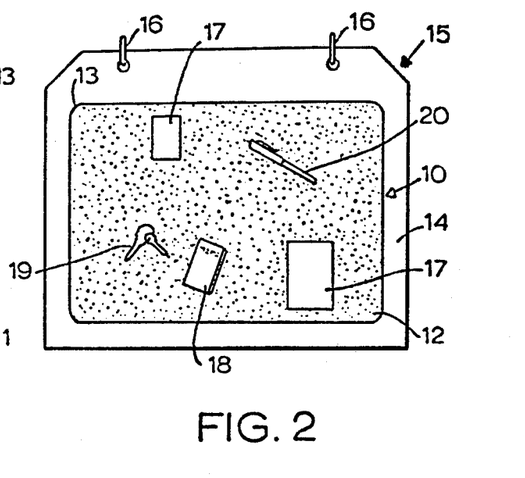
FIG. 2 is a face view of the display device of FIG. 1 in use, attached to a wooden base and with various articles adhered thereto for display.

In the drawings, the display device 10 of FIG. 1 may be essentially a piece of resilient material 11 of substantial thickness having a tough, pressure-sensitive surface 12 and, conveniently, rectangular in shape; it may have rounded corners as at 13. If desired, the device 10 may be mounted, as shown in FIG. 2, on a rigid base 14 of cardboard, wood or other material and secured to a wall, as by hooks 16. Various articles (as illustrated by paper 17, notes 18, keys 19 and pen 20) may then be attached for display by merely pressing the article onto the sensitive surface 12.

Figure 3:
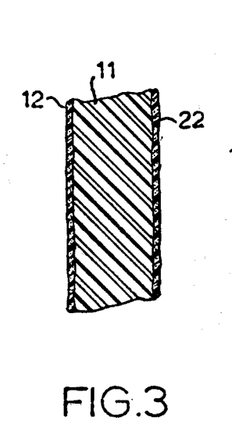
FIG. 3 is a fragmentary sectional view taken along the line 3—3 of FIG. 1, illustrating one form of construction.

As shown in section in FIG. 3, the device may be composed of a thick layer 11 of non-tacky resilient material, such as a polyurethane foam, on the front surface of which is applied a thin layer 12 of pressure-sensitive adhesive, the texture of the foam imparting a rough surface to the adhesive layer 12. Preferably, the reverse side of foam layer 11 is also coated with an adhesive layer 22, which may or may not be composed of the same adhesive as layer 12 but is adapted to permit ready mounting of the device 10 on any desired solid surface.

Figure 4:
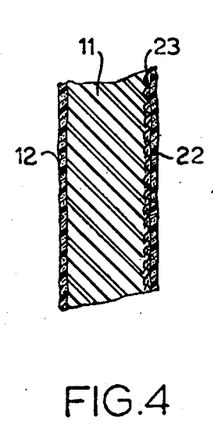
FIG. 4 is a view similar to FIG. 3 but illustrating a preferred construction.
Figures 5, 6:
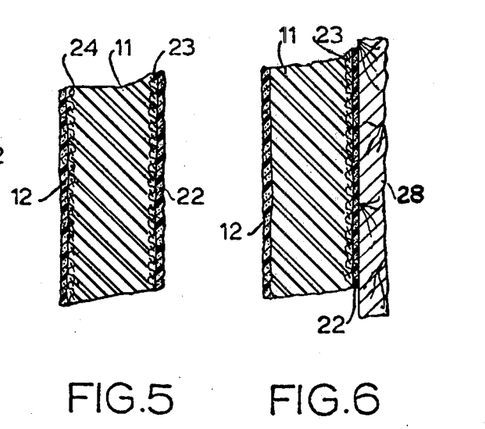
FIG. 5 is a view similar to FIG. 4 but illustrating an alternate form of construction.
FIG. 6 is a fragmentary sectional view illustrating how the construction of FIG. 4 may be applied to any solid base, such as the board base of FIG. 2.

Since a foam layer 11 of maximum resiliency is of necessity low in tensile strength, and severe usage may result in rupture, it may be desirable to reinforce the same, especially on the back. This may be accomplished by laminating a fabric, such as cheesecloth, to the resilient layer 11, as is illustrated in FIG. 4 by the fabric layer 23 joined to the reverse side of layer 11 just below, or as part of, adhesive layer 22. If desired, as shown in FIG. 5, a fabric layer 24 may likewise be laminated to the front surface of the resilient layer 11. By proper selection of the texture of the fabric 24, any desired roughness can be imparted to the surface of adhesive 12.

Figure 7:
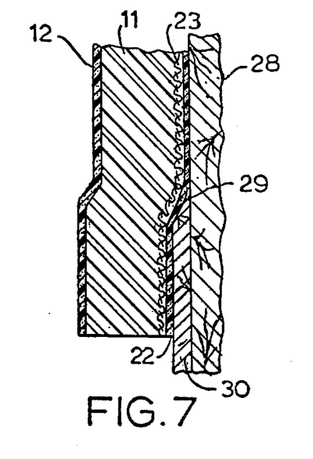
FIG. 7 is a fragmentary sectional view illustrating how the construction of FIG. 4 may be applied to an uneven vertical surface, such as an irregular surfaced wall.

Since the device 10 of FIG. 1 is flexible, it may readily be attached to a wall or almost any desired surface by the use of an adhesive, such as adhesive 22 (FIGS. 3–5). When permanent attachment is intended, an extraneous cement or glue may be used, or the adhesive 22 may be chosen from those which give high bonding power. If it is intended that the device 10 be moved occasionally, the adhesive 22 may be simliar to, or the same as, adhesive 12. Preferably, the adhesive 22 should be somewhat stronger in holding power than adhesive 12 but sufficiently weak to permit removal if and when desired. FIG. 6 shows the device 10, with reinforcing as illustrated in FIG. 4, applied to a flat wall 28. FIG. 7 illustrates the same device applied to a surface 28 which is not smooth but has an offset at 29 caused by the molding 30. Since the device 10 is flexible, it can readily adapt itself to the offset 29 without destroying the effectiveness of the device 10 as a display medium.

Figure 8:
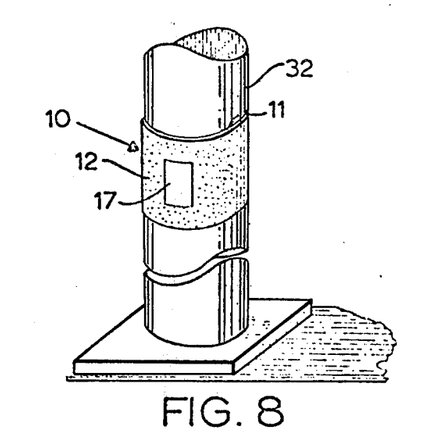
FIG. 8 is a perspective view illustrating the attachment of the device of FIG. 1 to a non-planar surface, namely a portion of a vertical column.

FIG. 8 illustrates the adaptability of the device 10 (when coated on the reverse side with a pressure-sensitive adhesive 22 as shown in FIGS. 3, 4, and 5) for rapid mounting almost anywhere desired, in this case on the vertical column 32. The device needs merely to be wrapped around the column and stuck in place by exerting pressure. Notices, such as paper 17, can readily be applied to the curved surface.

Figure 9:
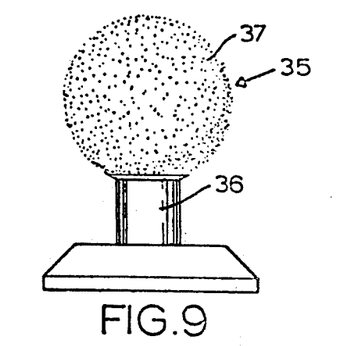
FIG. 9 is a view in elevation of a spherical display device in accordance with a form of the invention.
Figure 10:
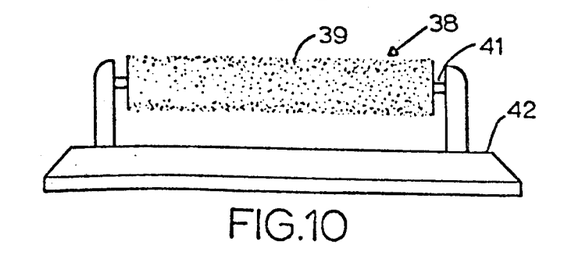
FIG. 10 is a front elevation view of a cylindrical display device in accordance with a form of the invention.

Although FIGS. 1–8 illustrte the invention through means of the rectangular flexible slab-like device 10, it is to be understood that the invention is not limited to that shape, nor is it necessarily limited to the form of a layer. FIGS. 9 and 10 illustrate other forms contemplated by the invention. FIG. 9 shows a pressure-sensitive adhesive coated polyurethane foam ball 35 mounted on a supporting base 36, which, if sized conveniently, may be used on a desk as a holder for memoranda and small objects. The ball 35 may be constructed by applying a suitable layer of polyurethane foam to a solid or hollow rigid ball or, by proper choice of properties (such as resiliency etc.) a solid foam ball may be used. In either case, a coating 37 of suitable pressure-sensitive adhesive is applied to the surface of the ball 35.

FIG. 10 shows a pressure-sensitive adhesive coated reslient cylinder 38 which, for example, may be properly sized to be used on a desk to display memos and small articles. The cylinder 38 may be composed of polyurethane foam coated with pressure-sensitive adhesive 38, formed on an axle 41 of any diameter, and supported by base 42.

Figure 11:
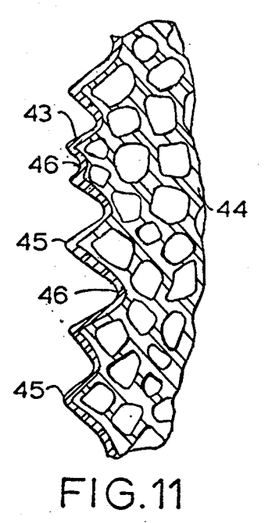
FIG. 11 is a greatly magnified view of a surface and near surfac portion of the adhesive of this invention before application of an adherend.

FIGS. 11 through 14 show somewhat what is happening. In FIG. 11 is shown a somewhat diagrammatic representation of a highly magnified portion of the surface 43 of the adhesive of this invention. The surface 43 is quite rough, due to the surface roughness of the foam 44 supporting it. There are many peaks 45 of varying height and many valleys 46 of varying depth.

Figure 12:
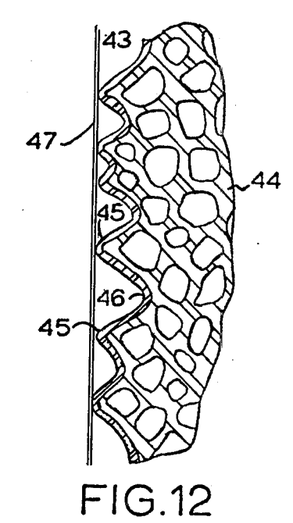
FIG. 12 is a similar view of the surface with an adherend lightly applied.
Figure 13:
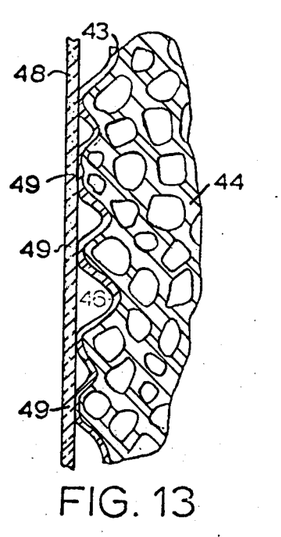
FIG. 13 is a similar view with an adherend applied with more pressure.
Figure 14:
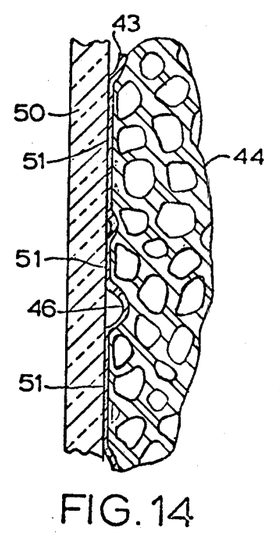
FIG. 14 is a similar view with an adherend applied still more forcefully.

When an adherend 47 such as rough paper is added, it adheres easily with light pressure, the adhesive at the peaks 45 alone being enough to retain it, as shown in FIG. 12. Perhaps the paper adherend 47 has only about 2% of its surface in contact with the adhesive. It is therefore easily removed when desired, but being light and easily held, no greater presure is needed to hold it indefinitely.

A heavier article, such as a scratch pad makes an adherend 48 (FIG. 13) that requires more surface area in contact with the adhesive for full support, say about 20%; so it is pushed on harder, flattening some of the peaks 45 into plateaus 49 that hold it quite well. Still heavier articles with hard slick surfaces, such as a glass ash tray, may have to be forced on quite forcefully, as the adherend 50 in FIG. 14, which has about 95% of its surface in contact with the adhesive. The resiliency of the foam enables it to flatten out into broad plains, 51 in this instance.

PROPERTIES OF THE RESILIENT BASE

From the foregoing, it will be recognized that the effectiveness of our devices will be dependent to a large measure upon the resiliency of the base employed, which, in turn, will vary according to the porosity and dimensions of the base and on the elasticity of the material of which it is composed.

Other materials suitable for the base component of the invention may be used, such as, embossed polyvinyl chloride film, enbossed polyester film or fabric, or embossed paper. However, generally speaking, foams are uniquely suited as having the required resiliency, compressibility, and roughness. The material selected should, of coure, have sufficient tensile strength for the purpose (40 p.s.i. (about 2800 grams per square centimeter) has been found sufficient) and should be compatible with whatever adhesive is used. The following examples show suggested values for certain illustrative foams, it being understood that the limits stated for any one property may vary as other properties are varied:

EXAMPLE 1.
POLYETHER POLYURETHANE FOAM

|  | Suggested | Illustrative Range |
|---|---|---|
| Thickness, inch | 0.25 | 0.125 to 2.0 |
|  | (about 0.6 cm.) | (about .32 to 5) |
| Porosity, pores per inch | 60 | 30 to 100 |
|  | (about 24/cm.) | (about 10 to 40/cm.) |
| Density, lbs./cu.ft. | 1.45 | 1 to 3 |
|  | (about 0.023 gm./cc.) | (about 0.016–0.048 gm./cc.) |
| I L.D., lbs./sq.ft. | 45 | 30 to 80 |
|  | (about 22 gm./sq.cm.) | (about 15–40 gm./sq.cm.) |
| Tensile strength, p.s.i. | 40 | 30 to 50 |
|  | (about 2800 gm./sq.cm.) | about 210 to 3500 gm./sq.cm.) |

Foams other than polyurethane, such as rubber or vinyl, may, of course, be used, provided, of course, that the physical properties are appropriate.

While the shape of the roughness is more important than the dimensions, it has been found by much experience that foams with pore counts much higher than 60 per linear inch (about 24 pores per lineal centimeter) are difficult to control, the surface being filled too much with adhesive and becoming too smooth, whereas coarser foams require too much adhesive, running up the cost of the product.

Materials of many chemical types may be used as adhesives. A number are disclosed in our co-pending application Ser. No. 612,547. Many acrylics, such as butyl acrylate and may of its homologues will also be found useful.

It is the physical properties which are important. As mentioned before, the adhesive must be a true resilient solid, not a viscous liquid. It must be soft enough to conform easily to the shape of the adherend, and this means a Young's modulus within the range of 5 to 100 psi (about 350 to 7000 grams per square centimeter). And it must be insoluble in water. These three physical properties are an absolute necessity in any washable tacky elastomer.

The type of tack— temporary or permanent—depends on the requirements of the end use. For instance, a lint removing device, as disclosed in our just-mentioned co-pending application, should have a high temporary tack, high to give a quick strong yank to lint, hair, etc. to be removed, and temporary since extreme ease of washability is desired. In contrast, the posting device disclosed in this application should have a medium and permanent tack, permanent because posted objects should be held permanently, and medium because too high a tack results in the destruction of such objects as paper when they are removed.

The high temporary tack is attained by using a very low modulus (typically 5 to 30 p.s.i. or about 350 to 2100 grams per square centimeter), a high internal viscosity (typically 3000–6000 poises), and a low surface free energy. The medium and permanent tack is achieved by a medium surface free energy, as low an internal viscosity as possible, and a somewhat higher modulus is permissible, perhaps as high as 100 p.s.i. (about 7000 grams per square centimeter).

In the lint-removing device, a high internal viscosity is a valuable asset. In the subject posting device too high an internal viscosity is a liability, since it will cause the damaging or destruction of such objects as paper unless they are removed extremely slowly, rendering the posting device more irritating than useful.

Internal viscosity is inconvenient to measure, and surface free energy is so difficult to measure in terms of ergs per square centimeter as to be impractical. Therefore, we have devised a sample empirical test to evaluate adhesives for possible use in a posting device.

A polished steel cylinder 60, 2 inches about 5 centimeters in diameter, is scribed with fine lines 61 parallel to the axis 62 and 5° apart over 90° of its surface 63. The cylinder 60 is mounted firmly in cantilever with the axis horizontal in the position shown in FIG. 15. A one mil about 25 microns) film of the adhesive in question 64 is cast on a polyester terephthalate (Mylar) strip 65 of one mil (about 25 microns) thickness, which is then trimmed to a width of 1 inch (2.54 centimeters). The cylinder 60 is washed carefully with methyl ethyl ketone, and the strip 65 is placed over the scribed lines 61 and one end 66 draped over the top. The strip 65 is pressed firmly against the cylinder 60 to attain as near as possible 100% contact area. A 100-gram weight 67 is hung gently on the trailing end 68 and the time noted at the 90° position. The progress of the peel line is noted from time to time. The total time allowed must be ample to ascertain that the peel line has in fact stopped moving, to insure that internal viscosity is not affecting the result. Twenty-four hours is suggested as a convenient period; if the line is still moving, the formulation may be discarded as not satisfactory for a posting device.

From this test, three things can be learned:

1. The stopping position of the peel line is a measure of the permanent tack of the adhesive in question. Much experience has shown that the optimum for best all-around performance is given by an adhesive that stops at approximately 20°. Values in the range of about 10° to about 40° will give reasonable success. Thus, less than about 10° will drop heavy objects, photographs may peel loose, etc. More than 40° may give trouble in delamination of paper. By way of contrast, out stickiest lint remover has a rating of 2°, and at the other extreme, a pressure-sensitive adhesive in use in a manufacturing process tests at 55° with a 500 gram weight.

2. The length of time from start to within 5° of finish (the finish is surprisingly definite) is a measure of the internal viscosity. Ten minutes is excellent. More than 1 hour will give too much trouble in delamination of paper.

3. If the creep is too high in an otherwise satisfactory adhesive, the adhesion will be greater tha the cohesion, and a residue will be left on the cylinder 60. This adhesive cannot be considered washable; lint and dust and paper fibres will embed in it and soon make it unusable.

If some material other than foam is to be used, such as embossed soft vinyl sheet, it should be noted that the shape of the roughness is important, i.e., the peaks should be relatively sharp and the valleys relatively rounded (See FIG. 11) so that a light pressure such as would be used in applying a pieceof paper to the posting device will result in a very low percentage area of contact. If the peaks are rounded, even a light pressure would result in so much area of contact that the paper might be damaged on removal. Sliced foam automatically gives this kind of surface—it must be designed into an embossed film, paper, or fabric.

Figure 16:
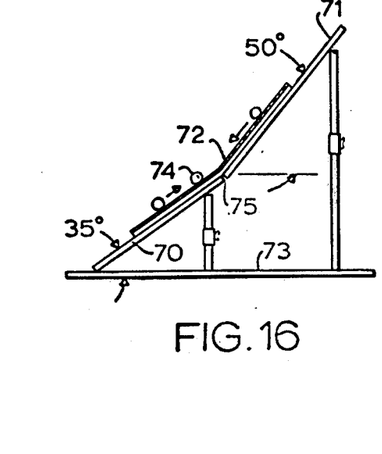
FIG. 16 is a view in side elevation of a roughness-measuring test apparatus usable with this invention.
Figure 17:
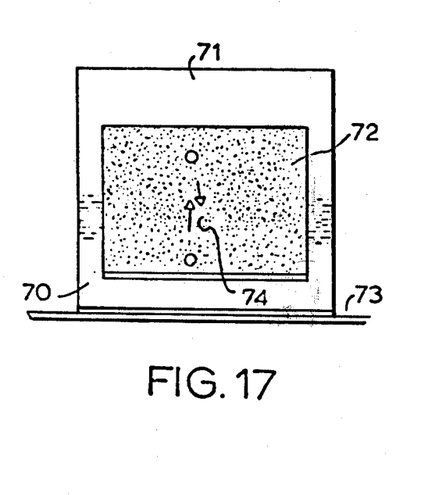
FIG. 17 is a view in front elevation of the apparatus of FIG. 16.

Whatever substrate is to be used, the film or adhesive will have a smoothing and rounding effect on the roughness of the substrate, and this is the final control over the strength of tack of the produc. In both the laboratory and the factory a quick conclusive test is required. Whereas measuring average roughness is relatively easy, (approximately 1000 microinches (about 25 microns)) measuring its shape is not, and it is easier and more direct to measure the result in the following manner:

Two plywood boards 70 and 71 coated with adhesive 72 are hinged together by a hinge 75 and mounted at two different angles from the horizontal 73 as shown in FIG. 16. A 1-inch (2.54 cm) diameter stainless steel ball 74 is cleaned carefully and, with freshly washed hands, is rolled up-hill on the surface of samples laid on the boards 70 and 71. The ball 74 comes to a stop and either stays where it stops or rolls back down. Thus we have a go-no go test; the ball 74 should roll back on the steeper slope 71 but stay put on the lower slope 70.

This test is objective, since the timing of the stop and possible restart back down are unaffected by the speed and accuracy with which the ball 74 is thrown, and operator error is eliminated.

It has been found by much experience that the board will be of the proper (rather aggressive) tack if the ball 74 rolls back down ona 50° slope and does not roll back down on a 35° slope. This range may, of course, be adjusted slightly downward or upward, but only slightly and after much field testing.

Formulations of several types are suggested in our companion application. These may be used as starting points and modified as desired for the particular end-use in mind, and will be satisfactory washable pressure-sensitive adhesives if the requisite physical characteristics as taught by this and our companion application are observed and fulfilled. There are also many acrylics, available under various trade names which, again provided that they are selected and combined to obtain the proper physical properties, will afford very satisfactory resuls.

PROPERTIES OF THE PRESSURE-SENSITIVE ADHESIVE

Figure 15:
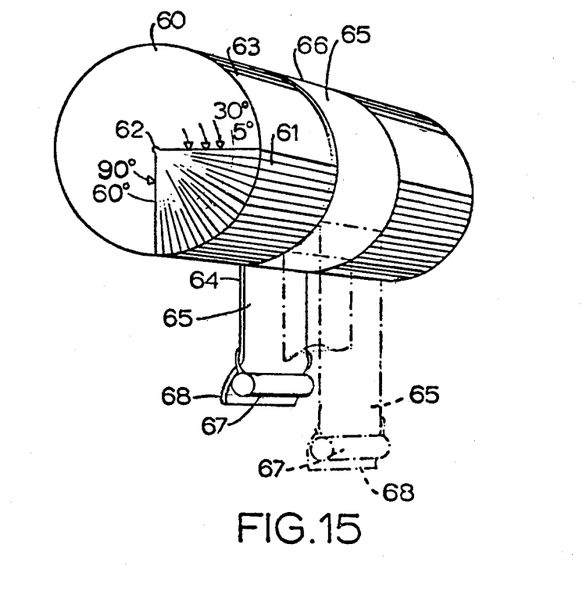
FIG. 15 is a view in perspective of a test-apparatus comprising a polished steel cylinder with scribed lines, with adhesive-coated strip on test and shown in alternative positions.

Although almost any pressure-sensitive adhesive compatible with the material selected for the resilient backing may be used to obtain some of the advantages of the invention, for full advantages, the water-washable tacky elastomers discussed above(and disclosed in our copending application Ser. No. 612,547, filed Jan. 30, 1967) are contemplated. These may have the following properties:

| | |
|---|---|
| Nature | true solid |
| Modulus of elasticity, p.s.i. | 5 to 50 |
| | (about 350 to 3500 g./sq.cm.) |
| Internal viscosity, hours (per test above, FIG. 15 | One hour or less |
| Free surface energy, degrees (per test above, FIG. 16) | 10° to 40° |
| Thickness to be applied to base, inch | 0.002 to 0.015 |
| | (0.05 to 0.38 millimeter) |

EXAMPLE 2.

Water-washable Tacky Adhesive Elastomer

| Ingredient | Parts by Weight |
|---|---|
| High-molecular-weight polyvinyl chloride e.g., Geon 121 made by B.F. Goodrich | 80 |
| Geon 222 " | 20 |
| Plasticizer, a polyester condensation product of sebacic acid and ethylene glycol of approximately 8000 molecular weight, e.g. Paraplex G25 made by Rohm and Haas | 400 |
| Barium zinc phenate, e.g. Argus Chemical Co., Mark KCB | 4 |
| Suitable pigment or dye, if desired, may be added. The suggested cure cycle is 10 min. at 380° F. | |

This compositionn has an internal viscosity of 3700 poises and a Young's modulus of about 10 p.s.i. (about 4200 grams per square centimeter).

Similar results may be obtained by substituting a copolymer of polyvinyl chloride and polyvinyl acetate for the polyvinyl chloride, the copolymer preferably having approximately the same physical qualities as that of this example and usually requiring slightly less plasticizer.

EXAMPLE 3.

Polyurethane-type Water-washable Tacky Composition

Two components are used:
Component A:

| Ingredient | Parts by weight |
| --- | --- |
| Polyether triol, e.g., Wyandotte TP 4542 | 100 |
| Toluene di-isocyanate, e.g., Allied Chemical, Nacconate | 12 |

The mixture is held at 160° F for 4 hours.
Component B:

| Ingredient | |
| --- | --- |
| Polyether triol as in Component A | 100 |
| Tin octoate catalyst, e.g., Witco Chemical Co. Tin catalyst C-4 | 0.5 |

The two prepared components are mixed in the proportions, by weight, of

| | |
| --- | --- |
| Component A | 100 |
| Component B | 83 |

Cure 4 hours at 180° F. The resultant composition had an internal viscosity of about 1800 poises and a Young's modulus of about 60 (about 4200 grams per square centimeter).

EXAMPLE 4.

Polysulfide-type Water-washable Tacky Material

| Ingredient | Parts by Weight |
| --- | --- |
| A. Resin Component: | |
| Polyalkylene polysulfide, e.g., Thiokol LP 31 | 100 |
| Chlorinated biphenyl, e.g., Monsanto Aroclor 1254 | 90 |
| Calcium carbonate, e.g., Diamond Alkali Co. Super Multiflex | 30 |
| Liquid coumarin-indene alkylated phenol, e.g., Neville Chemical Co. 10° Nevillac | 20 |
| Bis-phenol-A and epichlorhydrin epoxy resin, e.g., Shell Chemical Epon 836 | 3 |
| Stearic acid | 0.5 |
| Sulfur | 0.1 |
| B. Catalyst Component | |
| Lead oxide | 100 |
| Chlorinated biphenyl, e.g., Monsanto Aroclor 1254 | 30 |
| Xylene | 10 |
| Zinc stearate | 2.5 |
| Stearic acid | 1.5 |

Then two components are mixed in the preferred ratio of 100 parts by weight of the resin mix to 3½ parts of catalyst mix and cured at 160°F for 2 hours.

EXAMPLE 5.

Neoprene Type Water-washable Tacky Material

| Rubber Solution: | Parts by Weight |
| --- | --- |
| Polychloroprene, e.g., DuPont Neoprene W | 100 |
| Toluene | 240 |
| Methyl ethyl ketone | 160 |

The mixture is stirred or tumbled until the neoprene is dissolved.

| Premix of catalyst, plasticizers, etc: | |
| --- | --- |
| Chlorinated biphenyl, e.g., Monsanto Aroclor 1254 | 20 |
| Zinc Oxide | 10 |
| Magnesium Oxide | 5 |
| Phenyl-beta-naphthylamine, e.g. DuPont Neozone D. | 2 |
| Ethyl thiourea, e.g., DuPont Accelerator NA 22 | 1 |

The materials are dispersed in the Aroclor, and then the following materials are added and mixed:

| | Parts by Weight |
| --- | --- |
| Monsanto Aroclor 1254 | 55 |
| Neville Chem. Co. 10°Nevillac | 25 |

The premix is added to the rubber solution and mixed. After it is thoroughly dry, cire for 30 minutes at 250° F.

We claim:

1. A rough-surfaced display device adapted to be affixed to a rigid support for the removable attachment of articles for exhibit without the use of extrinsic fasteners, and with freedom from adhesive-retetion upon removal, including in combination: a resilient base at least 0.3 cm thick presenting a rough outer surface for display and having dimensions and elasticity sufficient to recoverably deform at least about 0.16 centimeter upon application of a perpendiculr force of about 70.3 grams to one square centimeter of surface, and a continuous coating of a pressure-sensitive, solid, water-washable tacky adhesive on and conforming to said rough surface to provide a controllable area of contact with a variety of said articles, said adhesive having a Young's modulus of from about 350 to 7000 grams per square centimeter and being water-insoluble and creep-free under load, said coating being water-washable without substantial modification of properties so as to clean the surface thereof by removing acquired contaminating lint, fuzz and dust particles therefrom, said adhesive coating having a surface free energy, as determined by placing a 25 microns strip of polyester terephthalate having a 25 microns layer of said adhesive into full contact, except for a trailing edge, with a polished steel cylinder with a 100-gram weight as a trailing edge and then noting the peel-back under static conditions by the degrees thereof, of between 10° and 40°, and an internal viscosity as determined by taking no more than 2 hours to reach within 5° of its final peel-back condition, said device having the following properties by the rolling ball test wherein a steel ball is rolled up a slope and let fall down freely: the ball sticks at about 35° of slope angle and rolls at about 50° of slope angle.

2. A device according to claim 1 wherein the exterior surface of the said adhesive coating has a surface roughness of about 25 microns, with the peaks sharper than the valleys.

3. The device of claim 1 in which the resilient base has a porosity between 10 and 40 pores centimeter.

4. The device of claim 1 in which the resilient base is a flat slab of polyurethane foam about 0.25 inch 0.65 centimeter in thickness and of substantial length and breadth.

5. The device of claim 1 in which the said base is cylindrical in shape.

6. The device of claim 1 having a front outer surface for display and a rear surface for attachment to supporting means, in which both said surfaces are coated with pressure-sensitive adhesive, said rear surface being coated with an adhesive of more tenacity than that coating said front surface.

7. The device of claim 1 in which the base is cubic in shape,

8. The device of claim 1 which is spherical in shape.

9. The device of claim 1 in which the said base is spherical in shape.

10. A rough-surfaced display device adapted to be attached to a wall without extraneous supporting means and, without extraneous fastening means, to removably display for extended periods of time both solid and flat objects, said objects having freedom from adhesive-retention upon removal, comprising essentially:
   a. a resilient mat 0.32 to 1.27 cm in thickness and having a back surface coated with pressure-sensitive adhesive and a rough front surface and of such dimensions and shape sufficient to include on said front surface all objects intended for display thereon at one time,
   b. said mat being composed of polyurethane foam having about 10 to 40 pores per centimeter and an indentation load deflection ASTM D1564-62T of about 22 gms per sq. cm,
   c. said mat being coated on said front surface with a water-washable pressure-sensitive tacky adhesive creep-free under load and having the following properties:
      i. a true solid derived from an elastomer
      ii. a Young's modulus of elasticity between about 350 and 3500 gms per sq. cm
      iii. a surface free energy of 10° to 40° when a 25 microns film of said adhesive is cast on a 25 microns polyester terephthalate strip, placed over a polished steel strip in full contact therewith except for a trailing edge, a 100-gram weight placed on said trailing edge and the strip allowed to peel under static conditions to the noted degrees of peel,
      iv an internal viscosity as determined herein of 2 hours or less to reach within 5° of its final position of peel, and
      v washable with soap and water without substantial modification of properties,
   d. said adhesive forming a continuous coating on and conforming to said rough front surface to provide a controllable area of contact with a variety of said articles, said coating being water-washable so as to clean the surface thereof by removing acquired contaminating lint, fuzz and dust particles therefrom,
   e. said mat when coated with said adhesive having the following properties by a steel rolling ball test wherein a ball placed thereon and rolling down at zero initial velocity:
      i sticks at about 35° and
      ii rolls at aboout 50°.

11. The device of claim 10 wherein said mat has about 60 pores per inch 24 pores per centimeter.

12. The device of claim 10 wherein said surface free energy is between 10° and 40° and said internal viscosity is less than 1 hour.

13. The device of claim 10 in which the said rear surface is coated with an adhesive of more tenacity than that coating the said front outer surface.

14. A rough-surfaced display device adapted to be attached to a wall without extraneous supporting means and, without extraneous fastening means, to removably display for extended periods of time both solid and flat objects, said objects having freedom from adhesive-retention upon removal, comprising essentially:
   a. a resilient mat 0.32-1.27 cm in thickness and having a rough front surface and a back surface and of plane dimensions and shape sufficient to include on said front surface all objects intended for display thereon at one time,
   b. said mat being composed of polyurethane foam having the following properties:
      i between 10 to 40 pores per centimeter,
      ii an indentation load deflection ASTM DI564-62T of about 22 gms/sq cm,
   c. said mat being coated on each of said surfaces with a pressure-sensitive adhesive having the following properties:
      i a true solid derived from an elastomer,
      ii a Young's modulus of elasticity between about 350 and 3500 gms/sq cm,
      iii a surface free energy, as determined by placing a 25 microns strip of polyester terephthalate having a 25 microns layer of said adhesive into 360° contact with a polished steel cylinder with a 100-gram weight as a trailing edge and then noting the peel-back under static conditons by the degrees thereof, of between 10° and 40°,
      iv an internal viscosity as determined by taking no more than 1 hour to reach within 5° of its final peel-back condition,
      v washable with soap and water without substatial modification of properties,
   d. said mat, when coated with said adhesive, having the following properties by the rolling ball test wherein a steel ball is rolled up a slope and let fall down freely:
      i the ball sticks at about 35° of slope angle and
      ii rolls at about 50° of slope angle,
   e. said adhesive forming a continuous coating on and conforming to said rough surface to provide a controllable area of contact with a variety of said articles and being water-washable so as to enable cleaning of the surface of said coating by removing acquired contaminating lint, fuzz and dust particles therefrom.

* * * * *